(12) United States Patent
Takahashi (10) Patent No.: US 11,558,704 B2
(45) Date of Patent: Jan. 17, 2023

(54) MANAGEMENT SERVER, AUDIO TESTING METHOD, AUDIO CLIENT SYSTEM, AND AUDIO TESTING SYSTEM

(71) Applicant: Yamaha Corporation, Hamamatsu (JP)

(72) Inventor: Daisuke Takahashi, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 185 days.

(21) Appl. No.: 17/162,672

(22) Filed: Jan. 29, 2021

(65) Prior Publication Data

US 2021/0243543 A1 Aug. 5, 2021

(30) Foreign Application Priority Data

Jan. 31, 2020 (JP) .............................. JP2020-015328

(51) Int. Cl.
```
H04R 29/00      (2006.01)
G05B 15/02      (2006.01)
G06F 13/40      (2006.01)
G10L 25/51      (2013.01)
H04R 3/00       (2006.01)
```
(52) U.S. Cl.
CPC .......... *H04R 29/001* (2013.01); *G05B 15/02* (2013.01); *G06F 13/4027* (2013.01); *G10L 25/51* (2013.01); *H04R 3/00* (2013.01)

(58) Field of Classification Search
CPC ........ H04R 29/001; H04R 3/00; G05B 15/02; G06F 13/4027; G10L 25/51
See application file for complete search history.

(56) References Cited

U.S. PATENT DOCUMENTS

| | | | |
|---|---|---|---|
| 2005/0134374 A1* | 6/2005 | Hench | H03F 1/08 330/86 |
| 2007/0025560 A1* | 2/2007 | Asada | G10K 15/12 381/61 |
| 2012/0237045 A1 | 9/2012 | Mihelich et al. | |
| 2013/0156213 A1* | 6/2013 | Pan | G10K 11/17854 381/71.4 |

(Continued)

FOREIGN PATENT DOCUMENTS

JP    2013-55676 A    3/2013

OTHER PUBLICATIONS

Extended European Search Report issued in European Application No. 21153709.7 dated Jun. 16, 2021 (10 pages).

(Continued)

*Primary Examiner* — Simon King
(74) *Attorney, Agent, or Firm* — Crowell & Moring LLP (57) ABSTRACT

A management server includes a memory, and at least one processor configured to control an audio client system, by execution of instructions stored in the memory. The at least one processor is configured to acquire a first transfer function measured for a portion of or for all of the first signal path in the audio client system. The at least one processor is also configured to generate a virtual second signal path for a portion of or for all of the first signal path in the audio client system, and calculate a second transfer function for a portion of or for all of the generated virtual second signal path. The at least one processor is also configured to determine a condition of the audio client system, based on a result of a comparison between the first transfer function and the second transfer function.

10 Claims, 8 Drawing Sheets

(56) References Cited

U.S. PATENT DOCUMENTS

| | | | |
|---|---|---|---|
| 2013/0272527 A1* | 10/2013 | Oomen | H04S 7/306 381/17 |
| 2016/0269828 A1 | 9/2016 | Smith et al. | |
| 2017/0070820 A1 | 3/2017 | Behringer | |
| 2017/0289717 A1 | 10/2017 | Little | |

OTHER PUBLICATIONS

Chinese-language Office Action issued in Chinese Application No. 202110118269.X dated May 9, 2022 with English translation (13 pages).

* cited by examiner

MANAGEMENT SERVER, AUDIO TESTING METHOD, AUDIO CLIENT SYSTEM, AND AUDIO TESTING SYSTEM

CROSS REFERENCE TO RELATED APPLICATION

This Application claims priority from Japanese Patent Application No. 2020-015328, filed Jan. 31, 2020, the entire contents of which are incorporated herein by reference.

BACKGROUND

Field of the Invention

The present disclosure relates to management servers, audio testing methods, audio client systems, and audio testing systems.

Description of Related Art

An audio system that includes speakers and amplifiers is placed in a hall, such as a music performance venue or a theater. Such a hall is used for a variety of purposes, which may change from day to day, and thus near-daily audio testing is required to set-up and maintain the condition of the audio system. Such testing requires the presence of a skilled person who has specialized expertise and adequate experience, and who must rely on his or her own ears to conduct the testing. Needless to state, such testing is complicated, time consuming and labor intensive.

Accordingly, there exists a technique for monitoring a condition of an audio system by use of machine equipment in place of a person.

By this technique a technology is provided to measure parameters of an audio signal that drives a speaker, estimate characteristics of the speaker based on the measured parameters, and apply a limiter to the audio signal supplied to the speaker, as necessary.

In a physical hall, an audio signal is supplied to an input end of an audio input/output apparatus for supply to a speaker via a signal path routed within a variety of apparatuses such as a mixer, an audio processor, and an amplifier. By use of this technique, characteristics of the speaker are estimated, and thus testing of the speaker can be carried out. However, the technique cannot be used to locate a failure in the signal path from the audio input/output apparatus to the speaker.

SUMMARY

In consideration of the circumstances outlined above, it is an object of the present disclosure to provide techniques that reduce a work load of a person in testing audio systems.

To achieve the above object, a management server according to an aspect of this disclosure is a management server including a memory; and at least one processor configured to control an audio client system, by execution of instructions stored in the memory, wherein the audio client system includes: a speaker; an input end configured to receive a supply of an audio signal; and a first signal path from the input end to the speaker, in which the at least one processor is configured to: acquire a first transfer function measured for a portion of or for all of the first signal path in the audio client system; generate a virtual second signal path for a portion of or for all of the first signal path in the audio client system, and calculate a second transfer function for a portion of or for all of the generated virtual second signal path; and determine a condition of the audio client system, based on a result of a comparison between the first transfer function and the second transfer function.

An audio testing method according to an aspect of this disclosure is an audio testing method, implemented by a processor, including: preparing an audio client system, where, the audio client system including: a speaker; an input end configured to receive a supply of an audio signal; and a first signal path from the input end to the speaker, acquiring a first transfer function measured for a portion of or for all of the first signal path in the audio client system; generating a virtual second signal path for a portion of or for all of the first signal path in the audio client system; calculating a second transfer function for a portion of or for all of the generated virtual second signal path; and determining a condition of the audio client system on a basis of a result of a comparison between the first transfer function and the second transfer function.

An audio client system according to an aspect of this disclosure is an audio client system including: a speaker; an input end configured to receive a supply of an audio signal; a first signal path from the input end to the speaker; a memory; and at least one processor, which upon execution of instructions stored in the memory, is configured to: measure a first transfer function for a portion or for all of the first signal path; and transmit the measured first transfer function to a management server, in which the first transfer function is used for determining, by the management sever, a condition of the audio client system.

An audio testing system according to an aspect of this disclosure is an audio testing system including: an audio client system; and a management server configured to control the audio testing system, in which the audio client system includes: a speaker; an input end configured to receive a supply of an audio signal; a first signal path from the input end to the speaker; a first memory; and at least one first processor, which upon execution of instructions stored in the first memory, is configured to: measure a first transfer function for a portion of or for all of the first signal path; and transmit the first transfer function to the management server, in which the management server includes: a second memory and at least one second processor, which upon execution of instructions stored in the second memory, is configured to: acquire the first transfer function transmitted from the audio client system, generate a virtual second signal path for a portion of or all of the first signal path in the audio client system, calculate a second transfer function for a portion of or all of the generated virtual second signal path; and determine a condition of the audio client system, based on a result of a comparison between the first transfer function and the second transfer function. Other objects, advantages and novel features of the present disclosure will become apparent from the following detailed description of one or more preferred embodiments when considered in conjunction with the accompanying drawings, in which:

DETAILED DESCRIPTION

Figure 1:
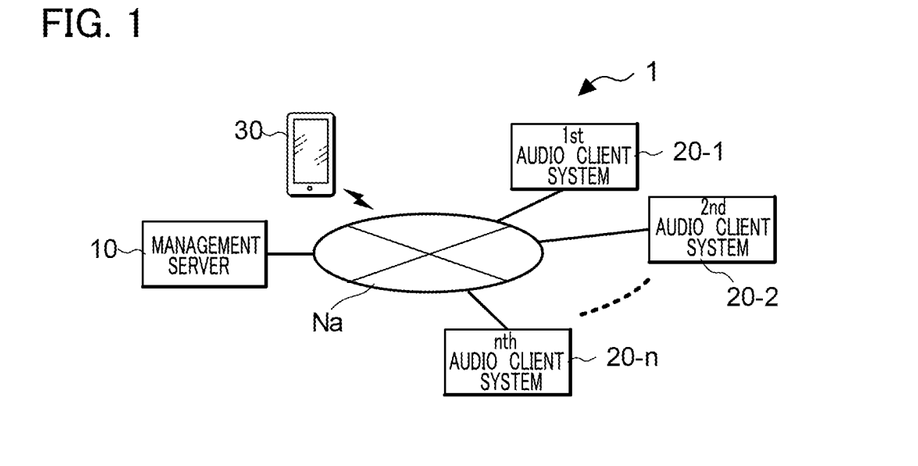
FIG. 1 is a diagram illustrating a configuration of an audio testing system.

FIG. 1 is a diagram illustrating the configuration of an audio testing system 1. The audio testing system 1 includes a management server 10 and a first audio client system 20-1, a second audio client system 20-2, and so on to an nth audio client system 20-n. Each of the audio client systems is connected to the management server 10 through a communication network Na. Here, "n" refers to any integer that is more than one. For convenience of explanation, in an example of FIG. 1, "n" is an integer that is greater than 3. The communication network Na is typically the Internet, but may another network, either wired or wireless. The communication network Na suffices to enable the management server 10 to communicate with the first audio client system 20-1 to the nth audio client system 20-n at remote locations. In addition, the audio testing system 1 includes a terminal apparatus 30, and the terminal apparatus 30 is connected to the communication network Na. The terminal apparatus 30 is a smartphone or a portable personal computer, and is operated by an administrator of the first audio client system 20-1 to the nth audio client system 20-n.

In this description, the term "connection" refers to a state in which two or more components are directly coupled to each other, and also to a state in which one or more intermediate components are present therebetween. A connection between components may be a physical connection (e.g., a wired connection using cables). Furthermore, in this description, the term "audio client system(s) 20" will be used unless the first audio client system 20-1 to the nth audio client system 20-n are not distinguished from each other. Each of the audio client systems 20 includes one or more speakers. The management server 10 determines a condition of the audio client systems 20. The management server 10 outputs various instructions to the audio client systems 20 and receives various information from the audio client systems 20.

Figure 2:
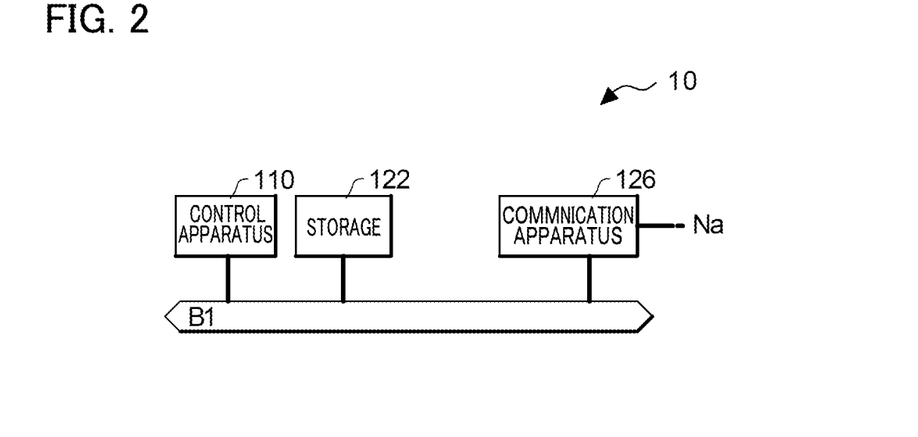
FIG. 2 is a diagram illustrating a hardware configuration of a management server in the audio testing system.

FIG. 2 is a diagram illustrating a hardware configuration of the management server 10. The management server 10 is an information processing terminal, such as a personal computer. The management server 10 includes a control apparatus 110, a storage 122, and a communication apparatus 126. These components are interconnected through a bus B1. The control apparatus 110 includes one or more processing circuits, such as a central processing unit (CPU), and controls each component in the management server 10.

The storage 122 is configured by one or multiple memories, each of which may be a known recording medium, such as a magnetic recording medium or a semiconductor recording medium. The storage 122 stores thereon a program for execution for the control apparatus 110 and various data for the control apparatus 110. The storage 122 may include a combination of several types of recording media. Furthermore, the storage 122 may be a portable recording medium that is removable from the management server 10, or may be an external recording medium (e.g., an online storage) that communicates with the management server 10 over the communication network Na. The communication apparatus 126 communicates with the audio client systems 20 and other similar apparatuses over the communication network Na.

Figure 3:
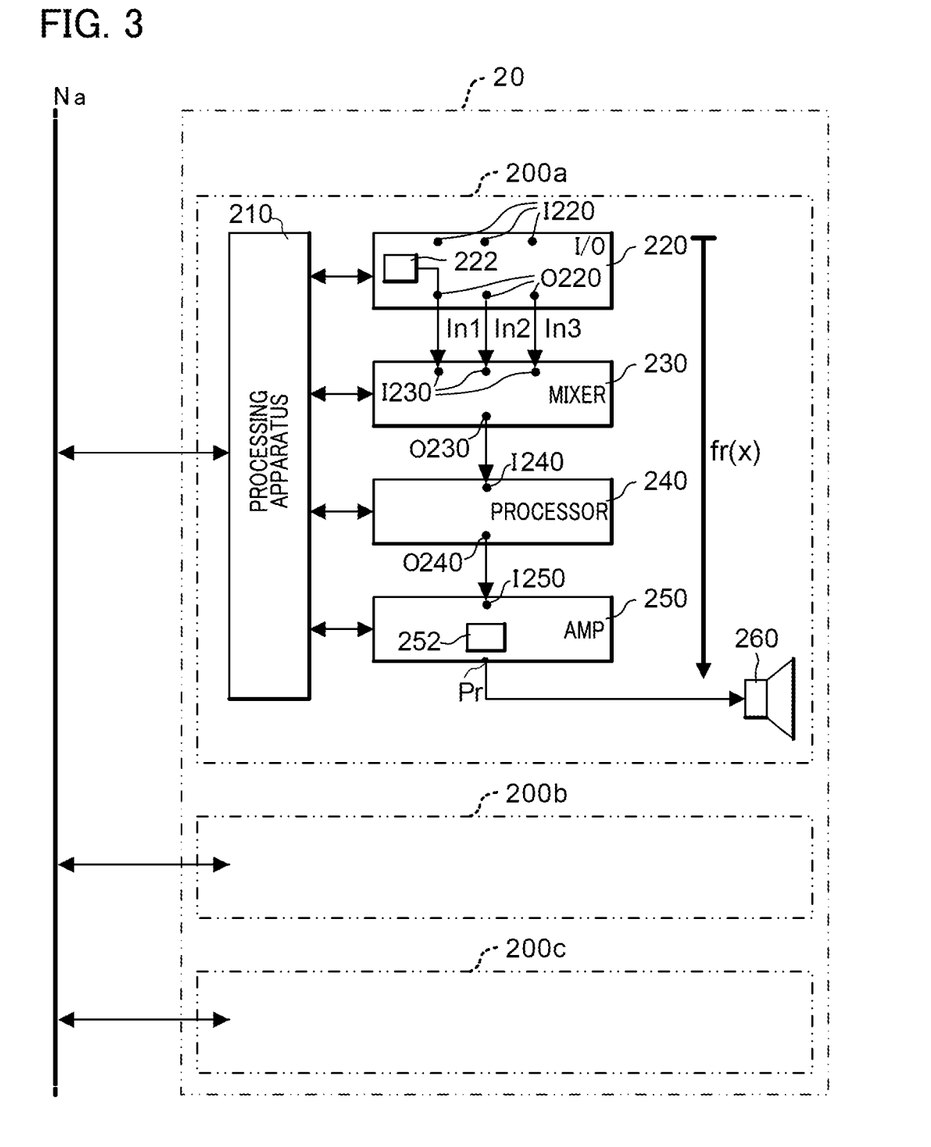
FIG. 3 is a diagram illustrating a hardware configuration of an audio client system in the audio testing system.

FIG. 3 is a diagram that illustrates a hardware configuration of a single audio client system configured from a certain number of audio client systems 20. In this embodiment, the audio client system 20 includes audio systems 200a, 200b, and 200c. The audio systems 200a, 200b, and 200c are placed in a hall (e.g., a music venue, a theater), or are placed outdoors. In this embodiment, the number of audio systems included in a single audio client system 20 is not limited to the example shown in FIG. 3. It is sufficient for at least one audio system 20 to be included in a single audio client system 20. In this embodiment, the audio client system includes the audio systems 200a, 200b, and 200c, and the audio client system 20 in its entirety can be thought of as a single audio system.

The configuration of each of the audio systems 200a, 200b, and 200c is substantially the same. Accordingly, the audio system 200a will be described as a representative example of these audio systems.

The audio system 200a includes a processing apparatus 210, an audio input/output (audio I/O) apparatus 220, a mixer 230, an audio processor 240, an amplifier 250, and the speaker 260. These components (apparatuses) are connected to each other by wire. It is of note that each of the components has one or more independent enclosures, and not all of the components are installed in a single enclosure.

The processing apparatus 210 is an information processing terminal, such as a personal computer, which is connected to the management server 10 over the communication network Na. The processing apparatus 210 controls the audio I/O apparatus 220, the mixer 230, the audio processor 240, and the amplifier 250.

In the present embodiment, the audio system 200a has a normal mode and a measurement mode. The normal mode is selected to achieve the primary purpose of the audio system 200a. Specifically, in the normal mode, an audio signal is supplied to an input end of the audio I/O apparatus 220, and a variety of processing is applied to the audio signal. Then the audio signal is converted to sound by the speaker 260, thereby enabling listeners to listen to the sound. The measurement mode is selected to measure a transfer function of a signal path, and this mode will be described below.

In an example of FIG. 3, the audio I/O apparatus 220 has three input ends I220, and three output ends O220. The number of these input ends and output ends is not limited to this example. The input ends I220 may have a one-to-one correspondence to the output ends O220, or may one-to-many correspondence to the output ends O220. It is determined by the user as to which input end I220 corresponds to which output end O220. For the sake of convenience, in this description a one-to-one correspondence will be described. In the normal mode, respective three audio signals are supplied to the three input ends I220, and the audio signals are then output to the three output ends O220. That is, the audio I/O apparatus 220 outputs the received audio signals from the input ends I220, to the three output ends O220, which respectively correspond to channels In1, In2 and In3.

Here, the audio signals represent signals to be supplied to the speaker 260. The audio signals may be analog or digital. Examples of the audio signals include a pickup signal from a microphone, an output signal from a musical instrument, and a video signal from a movie.

The audio I/O apparatus 220 includes an oscillator 222 that generates pink noise. In the measurement mode, the audio I/O apparatus 220 outputs pink noise to the channel In1. Pink noise represents a noise signal, an intensity of which is inversely proportional to a frequency. In this embodiment, pink noise generated by the oscillator 222 is output to the channel In1, but may be output to another channel, or may be output to each of the channels in sequence.

The mixer 230 has three input ends I230, and one output end O230. In this embodiment, the three input ends I230 correspond to the respective three output ends O220 included in the audio I/O apparatus 220. The mixer 230 selects required channels for mixing from among the channels In1, In2, and In3 by manual operation of the user or in accordance with instructions from the processing apparatus 210. Then mixer 230 mixes the audio signals supplied from the selected channel, and outputs the mixed audio signal to the output end O230.

The audio processor 240 has an input end I240 that receives a supply of an audio signal from the mixer 320, and an output end O240. The audio processor 240 processes (imparts effects to) the audio signal output from the mixer 230 by manual operation of the user or in accordance with instructions from the processing apparatus 210.

The amplifier 250 has an input end I250 that receives a supply of an audio signal from the audio processor 240, and an output end Pr. In the normal mode, the amplifier 250 amplifies the audio signal output from the audio processor 240 by a given gain. This gain is determined by the user or by the processing apparatus 210. The amplifier 250 outputs the amplified audio signal to the output end Pr.

The amplifier 250 further includes a sensor 252 that measures voltage signal at the output end Pr. In the measurement mode, the amplifier 250 supplies a result of the measurement obtained by the sensor 252 to the processing apparatus 210.

The speaker 260 converts the signal output from the output end Pr of the amplifier 250 into sound.

Figure 4:
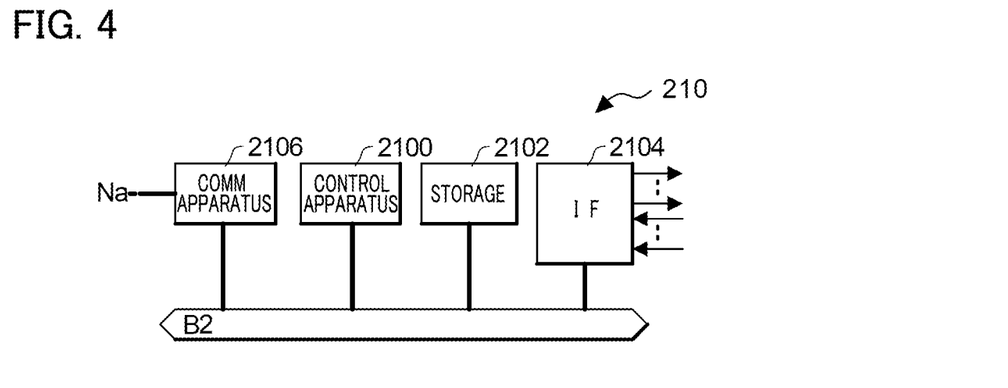
FIG. 4 is a diagram illustrating a hardware configuration of a processing apparatus provided in an audio client system.

FIG. 4 is a diagram illustrating a hardware configuration of the processing apparatus 210 provided in the audio system 200a. The processing apparatus 210 includes a control apparatus 2100, a storage 2102, an interface (IF) 2104, and a communication apparatus 2106. These components are interconnected through a bus B2. The control apparatus 2100 includes one or multiple processing circuits, such as a CPU, and controls each component provided in the processing apparatus 210. The storage 2102 is configured as one or multiple memories using a known recording medium. The storage 2102 stores a program executed by the control apparatus 2100 and various data used by the control apparatus 2100. The interface 2104 carries out input and output of information among the audio I/O apparatus 220, the mixer 230, the audio processor 240 and the amplifier 250. The communication apparatus 2106 communicates with the management server 10 over the communication network Na.

Figure 5:
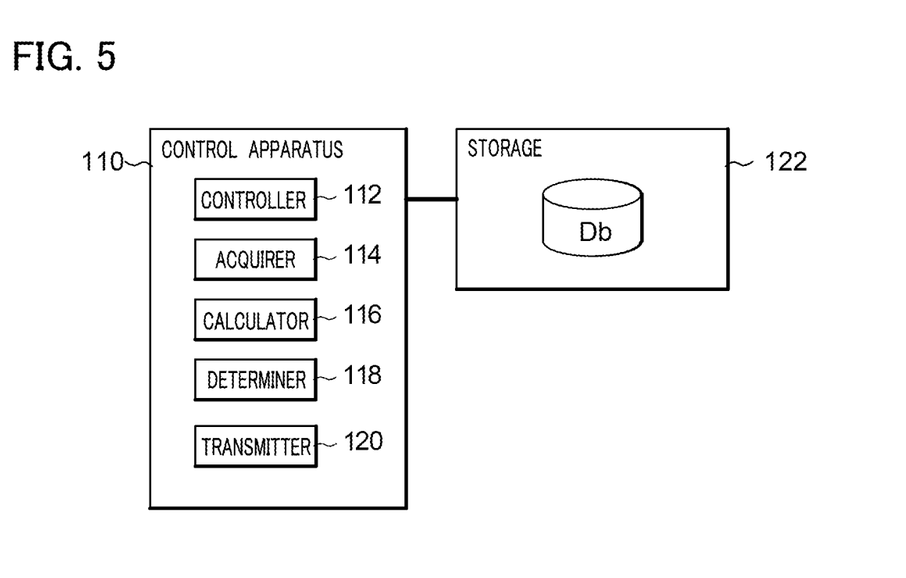
FIG. 5 is a functional block diagram of the management server.

For convenience, processing carried out by the control apparatus 110 of the management server 10 will be described using functional blocks. FIG. 5 is a diagram illustrating functional blocks generated by the control apparatus 110 and the storage 122 provided in the management server 10. In the management server 10, a program stored in the storage 122 is executed by the control apparatus 110. As a result, in the control apparatus 110a, a controller 112, an acquirer 114, a calculator 116, a determiner 118 and a transmitter 120 are generated as functional blocks. In the storage 122, a database Db is generated as a functional block.

In this embodiment, although the functional blocks are assumed to be generated by execution of software in this embodiment, the method of realizing each functional block is not limited thereto. In other words, each functional block may be realized by hardware rather than by execution of software, or by a combination of both hardware and execution of software.

The database Db, which is generated in the storage 122, includes restore data for the audio system 200a. The restore data refers to data for restoring the mixer 230, the audio processor 240 and the amplifier 250 in the audio system 200a to a given configuration (e.g., the default configuration or a user-defined configuration). Specifically, the restore data refers to a set of the following: (i) configuration data indicative of selection made by the mixer 230 and fader positions; (ii) parameters representative of effects to be carried out by the audio processor 240; (iii) an attenuator value of the amplifier 250; and (iv) data indicative of whether mute is On or Off. In other words, the restore data refers to a set of data that defines the condition of a signal path from one input end among the input ends I220 of the audio I/O apparatus 220 to the output end Pr of the amplifier 250. The restore data may be provided for each given condition (e.g., the default condition or a user-defined condition), may be provided for each of the audio systems 200a, 200b and 200c, or may be provided for each of the audio client systems 20.

In this embodiment, in the measurement mode, the following processing is carried out by the audio system 200a. Specifically, a transfer function Fr(x) is measured by the audio system 200a. The transfer function Fr(x) is represented by a signal path from any of the input ends I220 of the audio I/O apparatus 220 to the output end Pr of the amplifier 250. It is of note that in actuality, transfer functions Fr(x) exist. Since input ends I220 are included in the audio I/O apparatus 220, signal paths exist between the audio I/O apparatus 220 and the output end Pr of the amplifier 250. However, since characteristics (e.g., a length of a signal path) of the signal paths are substantially the same, the transfer functions Fr(x) are also substantially the same. Accordingly, in this embodiment, there is employed one transfer function Fr(x), which is represented by any one signal path from among the signal paths.

Meanwhile, the following processing is carried out by the management server 10. Specifically, a virtual signal path that is the same as that within the audio system 200a is generated by simulation in the management server 10, and a transfer function Fv(x) representative of the generated signal path is calculated by the management server 10.

Thereafter, the transfer function measured by the audio system 200a, that is, the real transfer function Fr(x), is compared to the virtual transfer function Fv(x). Based on a result of this comparison, a condition of the signal path within the audio system 200a is determined by the management server 10. The signal path from an input end I220 of the audio I/O apparatus 220 to the output end Pr of the amplifier 250 is an example of a first signal path. The real transfer function Fr(x) is an example of a first transfer function.

Figure 9:
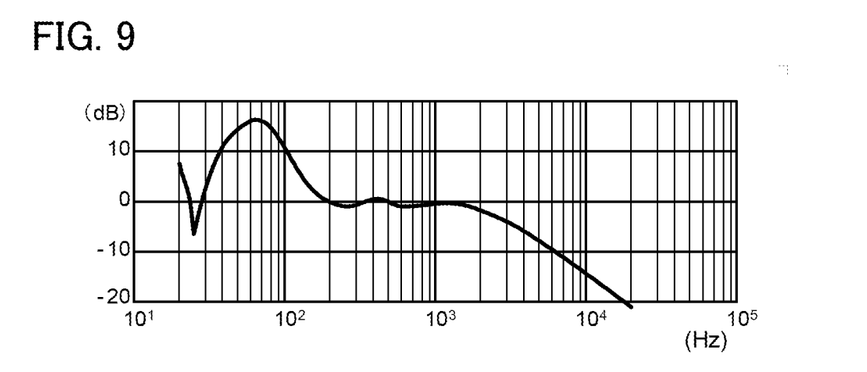
FIG. 9 is a graph illustrating an example of a transfer function measured in an audio client system.

In general, a transfer function refers to a relationship between a signal supplied to an input end and a signal output to an output end. In this embodiment, a frequency (gain characteristic) is used that is representative of a relationship between a ratio and a frequency; the ratio being the ratio of a voltage at the input end to a voltage at the output end. However, a function (gain characteristic) may be used that is representative of a relationship between a phase and a frequency; the phase being the phase between a signal supplied to the input end and a signal output to the output end. In this embodiment, the signal path has two ends, one of which is an input end of the audio I/O apparatus 220, and the other of which is the output end Pr of the amplifier 250. FIG. 9 is an example graph illustrating a transfer function. The vertical axis shows ratio (dB), and the horizontal axis shows frequency (Hz).

Returning to FIG. 5, among the functional blocks generated in the control apparatus 110, the controller 112 controls the acquirer 114, the calculator 116, the determiner 118 and the transmitter 120. Further, the controller 112 manages the audio client systems 20. The acquirer 114 acquires information transmitted from an audio client system 20, specifically the transfer function Fr(x) measured by an audio system to be tested.

Figure 6:
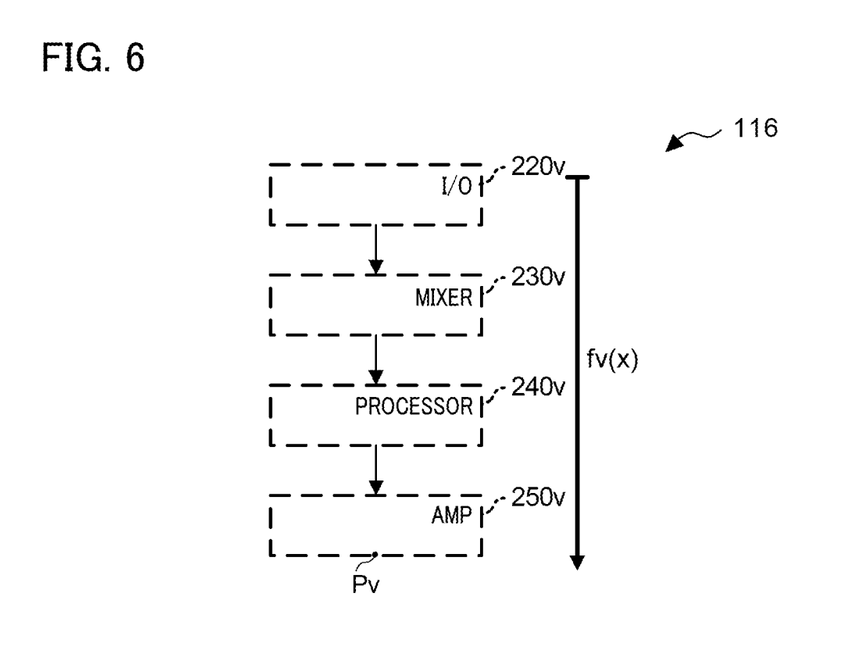
FIG. 6 is a diagram illustrating a virtual apparatus simulated by a calculator.

The calculator 116 calculates a virtual transfer function defined by a signal path within the audio system to be tested. Specifically, first, if the audio system to be tested is the audio system 200a, as illustrated in FIG. 6, the calculator 116 generates, by simulation, virtual apparatuses including a virtual audio I/O apparatus 220v, a virtual mixer 230v, a virtual audio processor 240v and a virtual amplifier 250v.

The virtual audio I/O apparatus 220v is obtained by simulation, and has the same circuit configuration as that of the audio I/O apparatus 220 provided in the audio system 200a.

The virtual mixer 230v is obtained by simulation, and has the same circuit configuration as that of the mixer 230 provided in the audio system 200a.

The virtual audio processor 240v is obtained by simulation, and has the same circuit configuration as that of the audio processor 240 provided in the audio system 200a.

The virtual amplifier 250v is obtained by simulation, and has the same circuit configuration as that of the amplifier 250 provided in the audio system 200a.

Second, by applying the restore data to the generated virtual apparatus, the calculator 116 sets the virtual apparatus to the same state as that of the audio system 200a as obtained when the restore data is applied to the audio system 200a.

Third, the calculator 116 obtains, by simulation, a voltage signal at a virtual output end Pv when the virtual audio I/O apparatus 220v supplies pink noise to the channel In1 thereof. The calculator 116 calculates a virtual transfer function Fv(x), based on (i) the pink noise and (ii) the voltage signal obtained by simulation. That is, the calculator 116 calculates a virtual transfer function Fv(x), based on (i) the input signal of the virtual apparatus and (ii) the output signal thereof.

Here, the signal path from the input end of the virtual audio I/O apparatus 220v (that is, the channel In1) to the virtual output end Pv is an example of a second signal path. The virtual transfer function Fv(x) is an example of a second transfer function.

The determiner 118 compares the real transfer function Fr(x) with the virtual transfer function Fv(x) to obtain a similarity between the two, and determines the state of the audio system 200a based on the similarity. Specifically, the determiner 118 determines whether the similarity is equal to or greater than a threshold. If affirmative, the determiner 118 determines that the audio system 200a to be tested is normal. In contrast, if the similarity is less than the threshold, the determiner 118 determines occurrence of a failure event in the audio system 200a.

Figure 10:
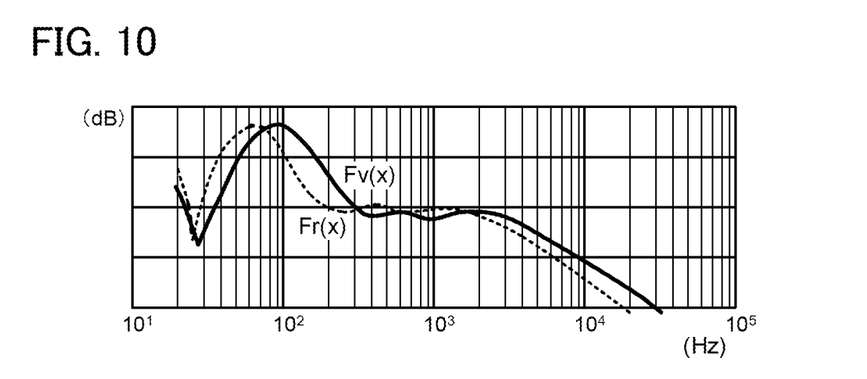
FIG. 10 is a graph illustrating an example of a comparison between a transfer function measured in an audio client system and a transfer function measured by the management server.

FIG. 10 is a graph illustrating an example of the comparison between two transfer functions. The dashed line denotes an example of the transfer function Fr(x) measured by the audio system 200a. The solid line denotes an example of the virtual transfer function Fv(x) calculated by the management server 10. The vertical axis shows a ratio (dB), and the horizontal axis shows a frequency (Hz). Specifically, the determiner 118 may calculate the similarity between the two transfer functions as follows. The determiner 118 may obtain a value of the ratio (dB) at each of a fixed interval (e.g., 100 Hz) in a given frequency bandwidth (e.g., audible frequency bandwidth ranging from 20 Hz to 20 kHz). Then the determiner 118 may obtain the difference between the ratio at a certain frequency and the ratio obtained immediately before the frequency over this frequency bandwidth, accumulate the obtained differences, and calculate the accumulated value as the similarity. Another method of calculating the similarity may be employed. The transmitter 120 transmits to the terminal apparatus 30 the result of determination indicative of whether the audio system 200a is normal.

Figure 7:
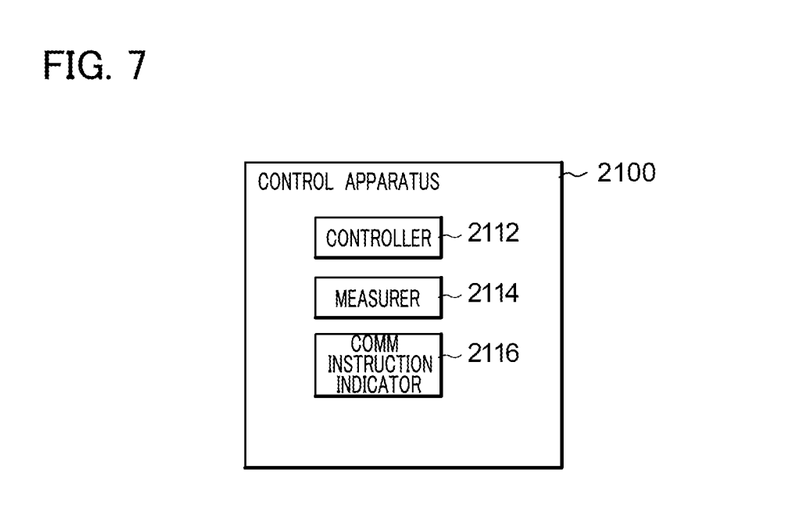
FIG. 7 is a functional block diagram of the processing apparatus provided in an audio client system.

Next, processing carried out by the processing apparatus 210 of the audio system 200a will be described with reference to functional blocks.

FIG. 7 is a diagram illustrating functional blocks generated by the control apparatus 2100. In the control apparatus 2100, a program stored in the storage 2102 is executed by the control apparatus 2100, thereby realizing each of a controller 2112, a measurer 2114 and a communication controller 2116 as functional blocks. The controller 2112 controls the measurer 2114 and the communication controller 2116.

In the measurement mode, the measurer 2114 analyzes a set of voltages detected by the sensor 252 to obtain a transfer function Fr(x) as follows.

First, the measurer 2114 analyzes the signal detected by the sensor 252 to obtain the set of voltages throughout the frequency domain (step S1). The targeted frequency bandwidth in the frequency domain ranges from 20 Hz to 20 kHz.

Second, the measurer 2114 acquires the output characteristics of the oscillator 222, which represents the relationship between the voltage intensity of pink noise and the frequency thereof (step S2).

Third, the measurer 2114 divides a voltage (e.g., v1) from among the set of voltages (e.g., v1, v2, . . . ) at a frequency (e.g., f1) by the pink noise voltage (e.g., vp) to obtain a ratio (e.g., v1/vp) at this frequency (step S3).

Fourth, the measurer 2114 shifts the frequency to be targeted to a given frequency (e.g., +100 Hz) from that frequency (e.g., f1). Then the measurer 2114 divides a voltage (e.g., v2) at a frequency (e.g., f2) by the pink noise voltage (e.g., vp) to obtain a ratio (e.g., v2/vp) at this frequency (step S4).

Thereafter, the measurer 2114 repeats steps S3 and S4 in the frequency bandwidth (e.g., an audible frequency bandwidth ranging from 20 Hz to 20 kHz). By this arrangement, the measurer 2114 obtains the transfer function Fr(x) represented by the signal path from the audio I/O apparatus 220 to the output end Pr.

The communication controller 2116 causes the communication apparatus 2106 to transmit information (e.g., the transfer function Fr(x) obtained by the measurer 2114) to the management server 10, and causes the communication apparatus 2106 to receive information (e.g., an instruction to initiate the measurement mode) from the management server 10.

Figure 8:
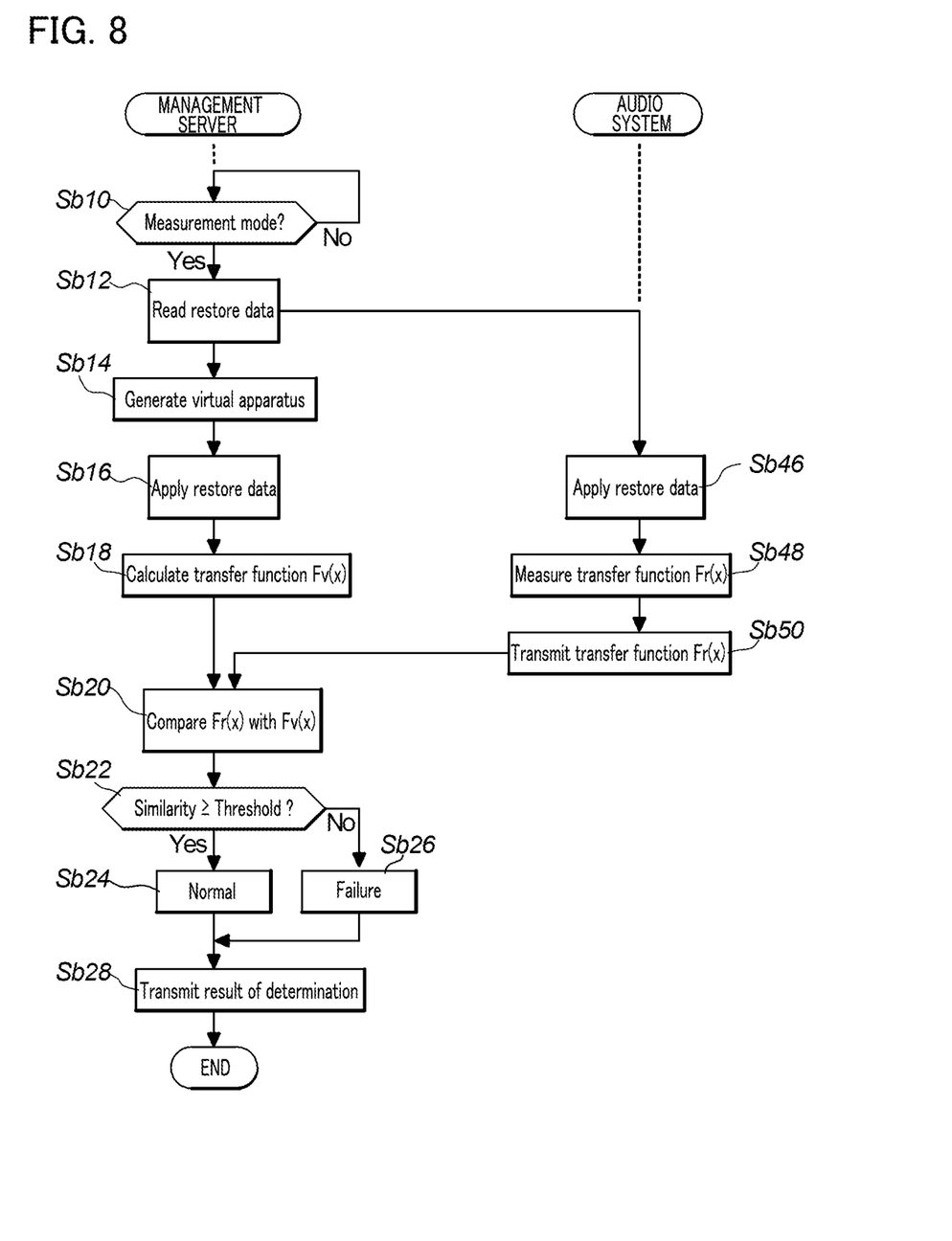
FIG. 8 is a flowchart illustrating operations carried out by the audio testing system.

Next, operations carried out by the audio testing system 1 will be described. FIG. 8 is a flowchart illustrating operations carried out by the audio testing system 1. Here, description will be given in which an audio system 200a provided in a certain audio client system 20 is tested.

First, in the management server 10, the controller 112 detects an instruction to measure the transfer function Fr(x) of the audio system 200a (step Sb10). That is, the controller 112 detects an instruction to initiate the measurement mode. This instruction may be a remote instruction originating either from the terminal apparatus 30 or from the management server 10. When receiving the remote instruction, the acquirer 114 is configured, upon receipt of the remote instruction, to initiate the acquisition; as is also the case for the calculator 116 and the determiner 118. If the measurement mode is not detected (that is, the result of determination in step Sb10 is "No"), the controller 112 returns the processing sequence to step Sb10. In other words, until a measurement mode is detected, the controller 112 essentially remains in a standby state.

It is of note that it is not necessary to test all of the audio systems provided in all of the audio client systems; and the administrator may determine an audio client system to be tested, as appropriate. Furthermore, measurement of the transfer function Fr(x) may be carried out in accordance with a schedule carried out by the management server 10.

If the measurement mode is detected (that is, if the result of determination in step Sb10 is "Yes"), the controller 112 reads out, from the database Db, the restore data for the audio system 200a (step Sb12). Alternatively, if the database Db includes a set of restore data, the controller 112 may read out desired restore data from the database Db. The controller 112 supplies the read-out restore data to the calculator 116 and the audio system 200a to be tested.

The calculator 116 generates, by simulation, a virtual apparatus including the virtual audio I/O apparatus 220v, the virtual mixer 230v, the virtual audio processor 240v, and the virtual amplifier 250v (step Sb14). The calculator 116 applies the restore data read out in step Sb12 to the generated virtual apparatus (step Sb16). By this arrangement, the virtual apparatus is set to the same state as that of the audio system 200a, which is obtained if the restore data is applied to the audio system 200a. The calculator 116 obtains, by simulation, a voltage signal at the virtual output end Pv when the virtual audio I/O apparatus supplies pink noise to the channel In1 of the virtual audio I/O apparatus 220v, and calculates a virtual transfer function Fv(x) as described above (step Sb18). Then the calculator 116 supplies this virtual transfer function Fv(x) to the determiner 118.

When the audio system 200a receives a supply of the restore data, the controller 2112 applies the restore data to the audio I/O apparatus 220, the mixer 230, the audio processor 240 and the amplifier 250 (step Sb46). By this arrangement, if the audio system 200a is normal, the audio system 200a is restored to the configuration defined by the restore data. Next, the oscillator 222 of the audio I/O apparatus 220 outputs pink noise under control of the controller 2112. The controller 2112 provides to the measurer 2114 an instruction to obtain the transfer function Fr(x). Upon receipt of this instruction, the measurer 2114 obtains a transfer function Fr(x) (step Sb48), and supplies this function Fr(x) to the communication controller 2116.

The communication controller 2116 causes the communication controller 2116 to transmit the transfer function Fr(x) obtained by the measurer 2114 to the management server 10 (step Sb50). Upon receipt of this instruction, the communication apparatus 2106 transmits the transfer function Fr(x) to the management server 10. Thereafter, upon receipt in the acquirer 114 of the transfer function Fr(x), the acquirer 114 supplies the transfer function Fr(x) to the determiner 118.

Upon receipt of a supply of the two functions Fr(x) and Fv(x), the determiner 118 compares the transfer function Fr(x) with the virtual transfer function Fv(x) to obtain the similarity (step Sb20). The determiner 118 determines whether this similarity is equal to or greater than a threshold (step Sb22). If affirmative (that is, if the result of determination in step Sb22 is "Yes"), the result means that the two transfer functions resemble each other. Therefore the determiner 118 determines that the audio system 200a is normal (step Sb24), and supplies the result of determination to the controller 112. In contrast, if the similarity is less than a threshold, the result means that the two transfer functions do not resemble each other. Therefore the determiner 118 determines occurrence of a failure event in the audio system 200a (step Sb26), and supplies the result of determination to the transmitter 120.

The transmitter 120 transmits the result of determination indicative of whether the audio system 200a is normal to the terminal apparatus 30 (step Sb28). Upon receipt of the result of determination, the terminal apparatus 30 displays on the display screen the result indicative of whether the audio system 200a is normal, for example. By referring to the display, the administrator can determine whether the audio system 200a is normal.

If the restore data is applied to the normal audio system 200a, the transfer function Fr(x) should be substantially the same as the virtual transfer function Fv(x) obtained by the management server 10. If the similarity between the two transfer functions is less than the threshold value, that is, if the real transfer function Fr(x) differs from the virtual transfer function Fv(x), it is possible that a failure event has occurred in the signal path from the audio system 200a to the output end Pr. Specifically, the following failure events may occur:

(i) failure of at least one of the audio I/O apparatus 220, the mixer 230, the audio processor 240, and the amplifier 250, in the audio system, (ii) damage to a cable connecting these components, and (iii) incorrect connection.

According to this embodiment, the administrator is not required to physically move to the place where the audio system 200a is located and rely on his or her ears to test the sound. Rather, while remaining in situ the administrator is able to determine whether the signal path from upstream (that is, the input end of the audio I/O apparatus 220) to downstream (that is, the output end Pr of the amplifier 250) in the audio system 200a is normal; thus a significant advantage is obtained in that a need for time consuming and labor intensive operations involved in testing are obviated. Furthermore, to carry out testing the need for specialized expertise and adequate experience are also obviated.

Although in this description, an example is given in which the audio system 200a is tested, this description can be applied to a case in which (i) either of the audio systems 200b and 200c is individually tested, and (ii) all of the audio systems 200a, 200b, and 200c are tested at the same time. The same effects are provided in these audio systems. Alternatively, all of the audio client systems 20 may be tested or only some of them may be tested. All of the audio client systems 20 may be tested or only some of them may be tested. The audio client systems 20 may be tested at the same time or may be tested in order.

In this embodiment, a transfer function Fr(x), which is defined by a signal path from an input end of the audio I/O apparatus 220 to the output end Pr of the amplifier 250 in the audio system 200a, is measured. The transfer function Fr(x) is compared to a virtual transfer function Fv(x) that is calculated by simulating the signal path, and as a result the condition of the audio system 200a is determined. A real transfer function that is defined by a portion of a real signal path may be compared to a virtual transfer function that is defined by a portion of a virtual signal path. In detail, a signal path from an input end I220 of the audio I/O apparatus 220 to the output end Pr of the amplifier 250 can be divided into the following paths:

(p1) a signal path within the audio I/O apparatus 220;
(p2) a signal path within the mixer 230;
(p3) a signal path within the audio processor 240;
(p4) a signal path within the amplifier 250;
(p5) cables connecting the audio I/O apparatus 220 to the mixer 23;
(p6) a cable connecting the mixer 23 to the audio processor 240; and
(p7) a cable connecting the audio processor 240 to the amplifier 250.

A virtual signal path can be divided similarly to the real signal path.

Accordingly, first, the determiner 118 is compared to a real transfer function Fr(x) with a virtual transfer function Fv(x), where the real transfer function Fr(x) is defined by a signal path within the audio I/O apparatus 220, and the virtual transfer function Fv(x) is defined by a signal path within the virtual audio I/O apparatus 220v.

As a result of the comparison, if the audio I/O apparatus 220 is normal, the determiner 118 extends the current real signal path from the audio I/O apparatus 220 to the output end O230 of the mixer 230. Similarly, the determiner 118 extends the current virtual signal path. The determiner 118 compares a real transfer function Fr(x) defined by this real signal path to a virtual transfer function Fv(x) defined by the virtual signal path.

As a result of the comparison, if the mixer 230 (including the cables labeled (p5)) is normal, the determiner 118 extends the current real signal path from the audio I/O apparatus 220 to the output end O240 of the audio processor 240. Similarly, the determiner 118 extends the current virtual signal path. The determiner 118 compares a real transfer function Fr(x) defined by the real signal path to a virtual transfer function Fv(x) defined by the virtual signal path.

As a result of this comparison, if the audio processor 240 (including the cable labeled (p6)) is normal, the determiner 118 extends the current real signal path from the audio I/O apparatus 220 to the output end Pr of the amplifier 250. Similarly, the determiner 118 extends the current virtual signal path. The determiner 118 compares a real transfer function Fr(x) defined by the real signal path to a virtual transfer function Fv(x) defined by the virtual signal path.

If the determiner 118 determines occurrence of a failure event partway through the determination, the determiner 118 terminates the determination without extending the signal paths to the next apparatus.

By use of such a method, among the audio I/O apparatus 220, the mixer 230, the audio processor 240, and the amplifier 250, if each component from the audio I/O apparatus 220 to a certain apparatus is normal, signal paths (including a real signal path and a virtual signal path) are extended. When an apparatus is determined as subject to a failure event, signal paths are no longer extended. Accordingly, an apparatus subject to a failure event can be identified quickly, as compared to a case in which all of the signal paths are tested. Namely, it is necessary only to obtain a transfer function Fr(x) that is defined by a portion of the real signal path and a virtual function Fv(x) that is defined by a portion of the virtual signal path.

In this way, determining a condition of the audio client system 20 not only includes determining a condition of the signal path of the entity of the audio system 200a, but also includes determining a condition of each apparatus (e.g., a mixer) included in the audio system 200a.

In the embodiment, if the similarity between the transfer functions Fr(x) and Fv(x) is equal to or greater than a threshold, it is determined that the audio system 200a to be tested is in a normal condition. If the audio system 200a is normal, theoretically the virtual transfer function Fv(x) should be the same as the real transfer function Fr(x). If the virtual transfer function Fv(x) differs from the real transfer function Fr(x), the simulation carried out by the calculator 116 may be incorrect.

Accordingly, even if the audio system 200a to be tested is normal, and the virtual transfer function Fv(x) differs from the real transfer function Fr(x), the calculator 116 may correct the simulation such that the virtual transfer function Fv(x) matches the real transfer function Fr(x), and thereby cause the correction to be reflected in subsequent calculations of the virtual transfer function Fv(x). By this correction, an accurate virtual transfer function Fv(x) can be provided.

Figure 11:
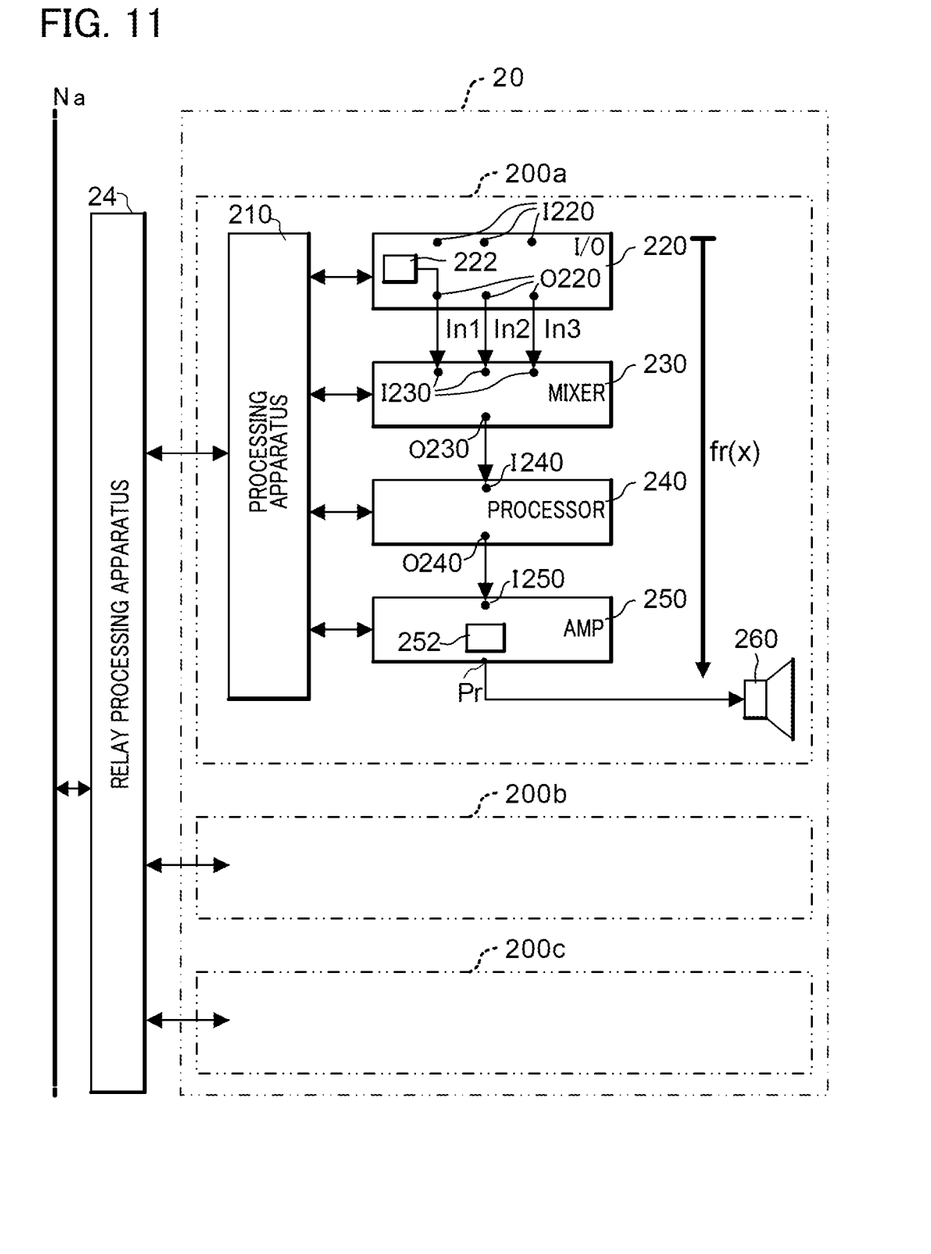
FIG. 11 is a diagram illustrating a hardware configuration of an audio client system.

In this embodiment, the communication controller 2116 is generated in the control apparatus 2100 of the processing apparatus 210. However, the communication controller 2116 is not limited thereto. For example, as illustrated in FIG. 11, the audio testing system 1 may include a relay processing apparatus 24. In this case, the relay processing apparatus 24 may be provided between the audio client system 20 and the communication network Na, and may connect to the management server 10 and the audio client system 20. The communication controller 2116 may be generated in the relay processing apparatus 24. The relay processing apparatus 24 is an information processing terminal, such as a personal computer. The relay processing apparatus 24 acts to relay information to the management server 10 or to the audio client system 20. The relay processing apparatus 24 transmits the transfer function Fr(x) to the management server 10 instead of the audio client system.

Figure 12:
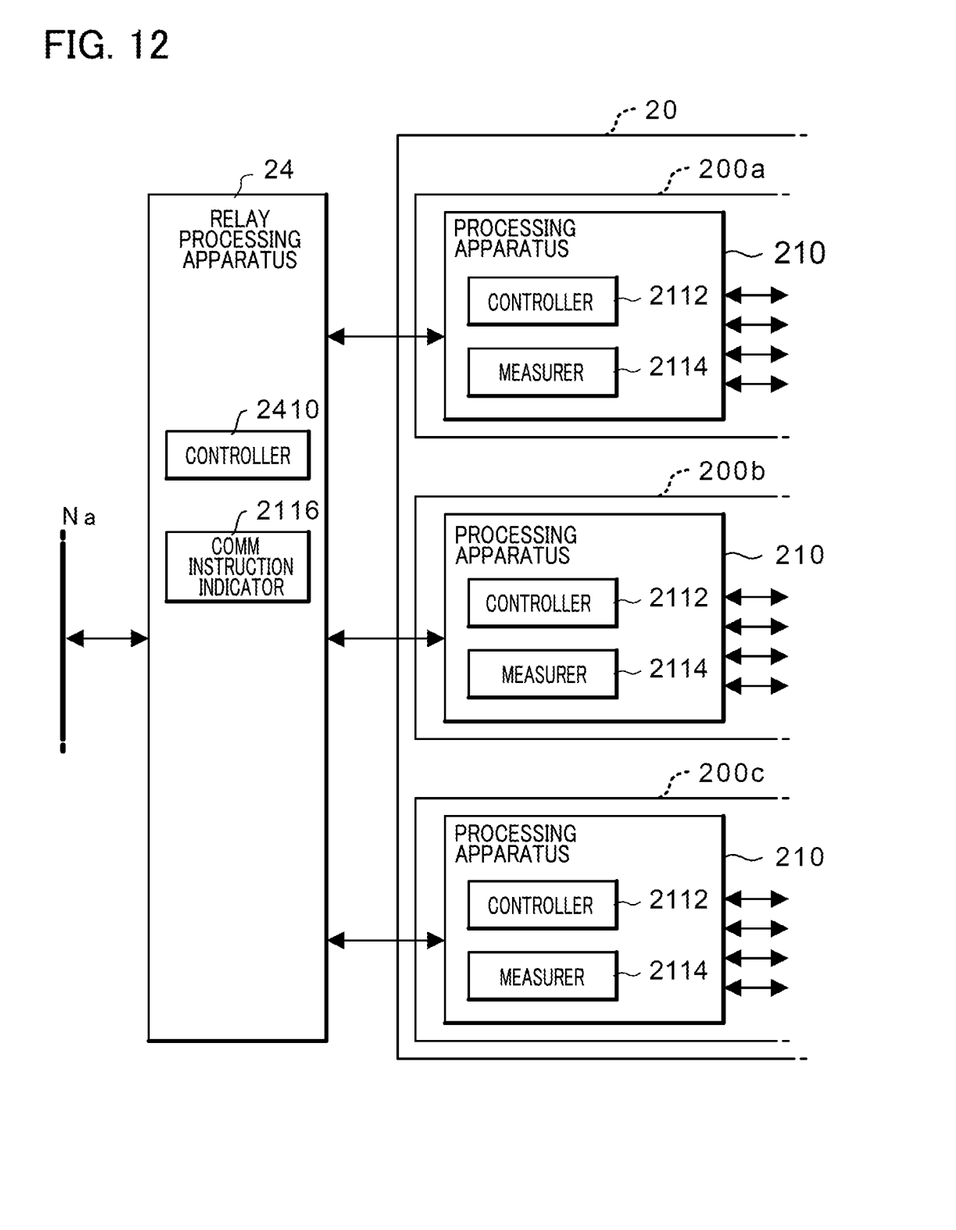
FIG. 12 is a functional block diagram of an audio client system.

Description will be given below by way of functional blocks illustrated in FIG. 12. Although not specifically illustrated, the relay processing apparatus 24 includes a controller and a storage. By having the controller execute a program stored in the storage, the communication controller 2116, and a controller 2410 that controls the communication controller 2116 are generated, as illustrated in FIG. 12. In the audio system 200a, the communication controller 2116 is not included in the functional blocks generated by the processing apparatus 210. Accordingly, the controller 2112 transmits the transfer function Fr(x) measured by the measurer 2114 to the communication controller 2116 provided in the relay processing apparatus 24.

The same applies to the audio systems 200b and 200c, in which the controller 2112 transmits a transfer function Fr(x) to the communication controller 2116 provided in the relay processing apparatus 24. For this reason, a case may occur where transfer functions are transmitted from the audio systems 200a, 200b, and 200c at the same time. Even if such a case occurs, the communication controller 2116 provided in the relay processing apparatus 24 transmits the three transfer functions, which are transmitted from the audio systems 200a, 200b and 200c, to the management server 10, in accordance with such factors as importance and a communication state of the communication network Na. Since the communication controller 2116 is generated in the relay processing apparatus 24, traffic in the communication network Na can be reduced.

In this embodiment, the sensor 252 provided in the amplifier 250 detects a voltage at the output end Pr and supplies the voltage to the processing apparatus 210, and in turn the processing apparatus 210 obtains a transfer function Fr(x). However, the method of obtaining the transfer function Fr(x) is not limited to thereto. For example, a microphone may be disposed in front of the speaker 260. In this case, the processing apparatus 210 receives a supply of an audio signal converted by the speaker 260 and obtains the transfer function Fr(x). By this arrangement, the condition of the signal path, from the audio I/O apparatus 220 to the speaker 260 via the mixer 230, the audio processor 240, and the amplifier 250 is sequentially determined.

In this embodiment, when a failure event occurs in the signal path, indication of the event is only displayed on the terminal apparatus 30. However, the configuration is not limited thereto. When a failure event occurs in the signal path, when the administrator inspects a relevant component (e.g., an audio system 200a), the management server 10 (the determiner 118) may register a report made by the administrator in the database Db in association with the transfer function Fr(x). Additionally, if the failure event occurs in the signal path at a later testing, the management server 108 may search the database Db for an apparatus having a transfer function closer to the transfer function Fr(x) measured at this testing. If the failure event is found at a later testing, the management server 10 may display the report associated with the transfer function. Accordingly, simply by referring to the result report the administrator will be able to identify the cause of the failure event, and thus rapidly resolve the problem.

APPENDIXES

From the foregoing embodiment, the following aspects will be clear.

A management server according to a first aspect of this disclosure is a management server including: a memory; and at least one processor configured to control an audio client system, by execution of instructions stored in the memory, where the audio client system includes: a speaker; an input end configured to receive a supply of an audio signal; and a first signal path from the input end to the speaker, in which the at least one processor is configured to: acquire a first transfer function measured for a portion of or for all of the first signal path in the audio client system; generate a virtual second signal path for a portion of or for all of the first signal path in the audio client system, and calculate a second transfer function for a portion of or for all of the generated virtual second signal path; and determine a condition of the audio client system, based on a result of a comparison between the first transfer function and the second transfer function.

According to this aspect, the condition of the audio client is determined based on the result of a comparison between the first transfer function and the second transfer function. The first transfer function refers to a transfer function measured for a portion of or for all of the signal path from an input end of the audio signal to the speaker. The second transfer function refers to a transfer function calculated for a portion of or for all of the virtually constructed signal path. Consequently, an administrator is not required to physically move to the place where the audio client is located. Rather, while remaining in situ the administrator is able to determine the condition of the audio client system; thus a significant advantage is obtained in that a need for time consuming and labor intensive operations involved in testing is obviated. Furthermore, to carry out testing a need for specialized expertise and adequate experience is also obviated.

It is of note that the phrase "input end" may refer to any of the input ends I220 of the audio I/O apparatus 220. Alternatively, "input end" may refer to any of the input ends I230 of the mixer 230, may refer to the input end I240 of the audio processor 240, or may refer to the input end I250 of the amplifier 250.

In an example of the first aspect (second aspect), the at least one processor is configured to correct the generated virtual second signal path, based on the result of the comparison.

According to this aspect, the correction enables the accuracy of the second transfer function Fv(x) calculated thereafter to be raised.

In an example of the first or second aspect (third aspect), the first signal path in the audio client system includes at least one of: a signal path within an audio input/output apparatus; a signal path within a mixer; a signal path within an audio processor; and a signal path within an amplifier.

According to this aspect, the administrator is able to know whether a failure event occurs and in which portion of the signal path, which includes at least one of an audio I/O apparatus, a mixer, a processor and an amplifier.

In an example of the first, second, or third aspect (fourth aspect), the at least one processor is configured to initiate each of the acquisition of the first transfer function, the generation of the first transfer function and the determination of the condition of the audio client system, in response to a remote instruction given at a terminal apparatus.

According to this aspect, since each the acquisition by the acquirer, calculation by the calculator, and determination by the determiner is initiated in response to an instruction given remotely at a terminal apparatus, a work load of the administrator can be reduced.

In an example of the fourth aspect (fifth aspect), the at least one processor is configured to initiate each of the acquisition of the first transfer function, the generation of the first transfer function and the determination of the condition of the audio client system, in response to a remote instruction given at a terminal apparatus.

According to this aspect, the administrator is able to know the result of determination using the terminal apparatus.

An audio testing method according to an aspect of this disclosure (sixth aspect) is an audio testing method, implemented by a processor, including: preparing an audio client system, where, the audio client system including: a speaker; an input end configured to receive a supply of an audio signal; and a first signal path from the input end to the speaker, acquiring a first transfer function measured for a portion of or for all of the first signal path in the audio client system; generating a virtual second signal path for a portion of or for all of the first signal path in the audio client system; calculating a second transfer function for a portion of or for all of the generated virtual second signal path; and determining a condition of the audio client system on a basis of a result of a comparison between the first transfer function and the second transfer function.

An audio client system according to an aspect of this disclosure (seventh aspect) is an audio client system including: a speaker; an input end configured to receive a supply of an audio signal; a first signal path from the input end to the speaker; a memory; and at least one processor, which upon execution of instructions stored in the memory, is configured to: measure a first transfer function for a portion or for all of the first signal path; and transmit the measured first transfer function to a management server, in which the first transfer function is used for determining, by the management sever, a condition of the audio client system.

According to this aspect, the management server determines the condition of the audio client system based on the first transfer function for the signal path of the audio client system. Accordingly, the administrator is not required to physically move to the place where the audio client system is located and rely on his or her ears to conduct testing.

An audio testing system according to an aspect of this disclosure (eighth aspect) is an audio testing system including: an audio client system; and a management server configured to control the audio testing system, in which the audio client system includes: a speaker; an input end configured to receive a supply of an audio signal; a first signal path from the input end to the speaker; a first memory; and at least one first processor, which upon execution of instructions stored in the first memory, is configured to: measure a first transfer function for a portion of or for all of the first signal path; and transmit the first transfer function to the management server, in which the management server includes: a second memory and at least one second processor, which upon execution of instructions stored in the second memory, is configured to: acquire the first transfer function transmitted from the audio client system, generate a virtual second signal path for a portion of or all of the first signal path in the audio client system, calculate a second transfer function for a portion of or all of the generated virtual second signal path; and determine a condition of the audio client system, based on a result of a comparison between the first transfer function and the second transfer function.

In an example of the eighth aspect (ninth aspect), a condition of the first signal path in the audio client system is defined based on restore data, the at least one second processor of the management server is configured to generate the virtual second signal path, based on the restore data, and the at least one first processor of the audio client system is configured to measure the first transfer function for the first signal path defined based on the restore data.

In an example of the tenth aspect (tenth aspect), the audio testing system further includes a relay processing apparatus configured to connect the audio client system and the management server, in which the relay processing apparatus is configured to transmit the first transfer function to the management server, instead of the audio client system.

DESCRIPTION OF REFERENCE SIGNS 1 audio testing system
10 management server
20 audio client system
114 acquirer
116 calculator
118 determiner
200 audio system
210 processing apparatus
2114 measurer
2116 transmission controller

What is claimed is:

1. A management server comprising:
a memory; and
at least one processor configured to control an audio client system, by execution of instructions stored in the memory, wherein
the audio client system includes:
a speaker;
an input end configured to receive a supply of an audio signal; and
a first signal path from the input end to the speaker, wherein the at least one processor is configured to:
acquire a first transfer function measured for a portion of or for all of the first signal path in the audio client system;
generate a virtual second signal path for a portion of or for all of the first signal path in the audio client system, and calculate a second transfer function for a portion of or for all of the generated virtual second signal path; and
determine a condition of the audio client system, based on a result of a comparison between the first transfer function and the second transfer function.

2. The management server according to claim 1, wherein the at least one processor is configured to correct the generated virtual second signal path, based on the result of the comparison.

3. The management server according to claim 1, wherein the first signal path in the audio client system includes at least one of:
a signal path within an audio input/output apparatus;
a signal path within a mixer;
a signal path within an audio processor; and
a signal path within an amplifier.

4. The management server according to claim 1, wherein the at least one processor is configured to initiate each of the acquisition of the first transfer function, the generation of the first transfer function and the determination of the condition of the audio client system, in response to a remote instruction given at a terminal apparatus.

5. The management server according to claim 4, wherein the at least one processor is configured to transmit a result of the determination to the terminal apparatus.

6. An audio testing method, implemented by a processor, comprising:
preparing an audio client system, wherein
the audio client system includes:
a speaker;
an input end configured to receive a supply of an audio signal; and
a first signal path from the input end to the speaker,
acquiring a first transfer function measured for a portion of or for all of the first signal path in the audio client system;
generating a virtual second signal path for a portion of or for all of the first signal path in the audio client system;
calculating a second transfer function for a portion of or for all of the generated virtual second signal path; and
determining a condition of the audio client system on a basis of a result of a comparison between the first transfer function and the second transfer function.

7. An audio client system comprising:
a speaker;
an input end configured to receive a supply of an audio signal;
a first signal path from the input end to the speaker;
a memory; and at least one processor, which upon execution of instructions stored in the memory, is configured to:
measure a first transfer function for a portion or for all of the first signal path; and
transmit the measured first transfer function to a management server, wherein
the first transfer function is used for determining, by the management sever, a condition of the audio client system.

8. An audio testing system comprising:
an audio client system; and
a management server configured to control the audio client system, wherein
the audio client system includes:
a speaker;
an input end configured to receive a supply of an audio signal;
a first signal path from the input end to the speaker;
a first memory; and
at least one first processor, which upon execution of instructions stored in the first memory, is configured to:
measure a first transfer function for a portion of or for all of the first signal path; and
transmit the first transfer function to the management server, wherein
the management server includes:
a second memory, and
at least one second processor, which upon execution of instructions stored in the second memory, is configured to:
acquire the first transfer function transmitted from the audio client system,
generate a virtual second signal path for a portion of or all of the first signal path in the audio client system,
calculate a second transfer function for a portion of or all of the generated virtual second signal path; and
determine a condition of the audio client system, based on a result of a comparison between the first transfer function and the second transfer function.

9. The audio testing system according to claim 8, wherein:
a condition of the first signal path in the audio client system is defined based on restore data,
the at least one second processor of the management server is configured to generate the virtual second signal path, based on the restore data, and
the at least one first processor of the audio client system is configured to measure the first transfer function for the first signal path defined based on the restore data.

10. The audio testing system according to claim 8, further comprising: a relay processing apparatus configured to connect the audio client system and the management server, wherein
the relay processing apparatus is configured to transmit the first transfer function to the management server, instead of the audio client system.

* * * * *

UNITED STATES PATENT AND TRADEMARK OFFICE
CERTIFICATE OF CORRECTION

PATENT NO. : 11,558,704 B2
APPLICATION NO. : 17/162672
DATED : January 17, 2023
INVENTOR(S) : Daisuke Takahashi It is certified that error appears in the above-identified patent and that said Letters Patent is hereby corrected as shown below:

In the Claims

In Column 16, Line 37, delete "generation" and replace with --calculation--.

In Column 16, Line 38, delete "first" and replace with --second--.

Signed and Sealed this
Twenty-first Day of May, 2024

Katherine Kelly Vidal
*Director of the United States Patent and Trademark Office*